US012798495B2

(12) United States Patent
Urano et al.

(10) Patent No.: US 12,798,495 B2
(45) Date of Patent: Nov. 17, 2026

(54) VEHICULAR CEILING INTERIOR COMPONENT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Keisuke Urano, Aichi-ken (JP); Iwao Udatsu, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 252 days.

(21) Appl. No.: 18/748,202

(22) Filed: Jun. 20, 2024

(65) Prior Publication Data

US 2025/0001955 A1 Jan. 2, 2025

(30) Foreign Application Priority Data

Jun. 30, 2023 (JP) ................................ 2023-108083

(51) Int. Cl.

| | |
|---|---|
| ***B60R 13/02*** | (2006.01) |
| ***B60R 21/214*** | (2011.01) |
| ***F16L 59/00*** | (2006.01) |

(52) U.S. Cl.

CPC .. *B60R 13/0212* (2013.01); *B60R 2013/0287* (2013.01); *B60R 21/214* (2013.01); *F16L 59/00* (2013.01)

(58) Field of Classification Search

CPC .............. B60R 13/0212; B60R 21/214; B60R 2013/0287

See application file for complete search history.

(56) References Cited

U.S. PATENT DOCUMENTS 6,264,238 B1 * 7/2001 MacDonald ............ B60R 21/04 296/187.05
7,661,703 B2 * 2/2010 Ono .................... B60R 21/2165 280/730.2

(Continued)

FOREIGN PATENT DOCUMENTS

JP 60-87744 U 6/1985

*Primary Examiner* — Tara Schimpf
*Assistant Examiner* — Daniel T Craig
(74) *Attorney, Agent, or Firm* — Greenblum & Bernstein, P.L. C.

(57) ABSTRACT

A vehicular ceiling interior component includes a board member that is a plate member and configured as a ceiling of a vehicular compartment, and a reinforcing member having an elongated shape and extending in an elongated direction. The reinforcing member is disposed on a vehicular exterior side surface of the board member and made of material having a linear expansion coefficient greater than a linear expansion coefficient of material of the board member. The reinforcing member includes a first fixing portion and a second fixing portion each of which is fixed to the vehicular exterior side surface of the board member and that are arranged along the elongated direction, and a connection portion that connects the first fixing portion and the second fixing portion and is away from the vehicular exterior side surface of the board member.

9 Claims, 10 Drawing Sheets

(56) References Cited

U.S. PATENT DOCUMENTS

| | | | | |
|---|---|---|---|---|
| 8,091,953 | B2 * | 1/2012 | Fukui | B60R 13/0231 296/187.05 |
| 8,141,940 | B2 * | 3/2012 | Ludwig | B60R 13/0225 296/214 |

* cited by examiner

VEHICULAR CEILING INTERIOR COMPONENT

CROSS REFERENCE TO RELATED APPLICATION

This application claims priority from Japanese Patent Application No. 2023-108083 filed on Jun. 30, 2023. The entire contents of the priority application are incorporated herein by reference.

TECHNICAL FIELD

The technology described herein relates to a vehicular ceiling interior component.

BACKGROUND

A vehicular ceiling interior component includes a board member having a plate shape and a reinforcing member (a resin foamed member) that is bonded to an upper surface of the board member. The board member that includes the reinforcing member can increase rigidity thereof.

In such a configuration including the reinforcing member that is bonded to the board member, the material of the board member may differ from the material of the reinforcing member. If the linear expansion coefficient of the reinforcing member is larger than the linear expansion coefficient of the board member, the following problems may be caused. When a vehicle including the board member and the reinforcing member described above is used in a cold area and the temperatures of the board member and the reinforcing member drop, the reinforcing member shrinks much largely than the board member. This creates stress acting on the board member and the board member may be wrinkled. To avoid such problems, the material having a large linear expansion coefficient may be used for the board member or the basis weight of the material may be increased to increase the rigidity of the board member. However, with such a configuration, the material of the board member cannot be selected freely and the weight of the board member may be increased.

SUMMARY

The technology described herein was made in view of the foregoing circumstances. An object is to provide a vehicular ceiling interior component in which a wrinkle is less likely to be created on the board member.

The present disclosure is related to a vehicular ceiling interior component that includes a board member that is a plate member and configured as a ceiling of a vehicular compartment; and a reinforcing member having an elongated shape and extending in an elongated direction. The reinforcing member is disposed on a vehicular exterior side surface of the board member and made of material having a linear expansion coefficient greater than a linear expansion coefficient of material of the board member. The reinforcing member includes a first fixing portion and a second fixing portion each of which is fixed to the vehicular exterior side surface of the board member and that are arranged along the elongated direction, and a connection portion that connects the first fixing portion and the second fixing portion and is away from the vehicular exterior side surface of the board member.

DETAILED DESCRIPTION

Figure 1:
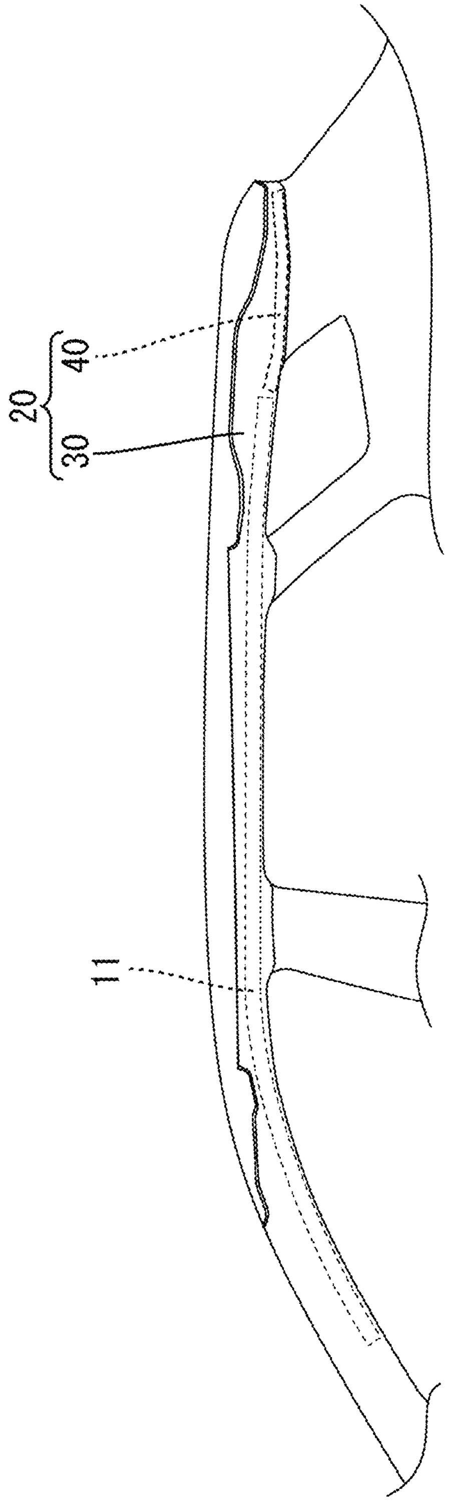
FIG. 1 is a side view of a vehicular ceiling portion including a ceiling interior component according to one embodiment.

One embodiment of the present disclosure will be described in detail with reference to FIGS. 1 to 10. In this section, a ceiling interior component 20 for a vehicle will be described as one example of a vehicular ceiling interior component. As illustrated in FIG. 1, the ceiling interior component 20 includes a board member 30 (an interior component body) having a plate shape and a reinforcing member 40 that is disposed on a vehicular exterior side surface of the board member 30. The reinforcing member 40 is illustrated by a broken line in FIG. 1.

Figure 9:
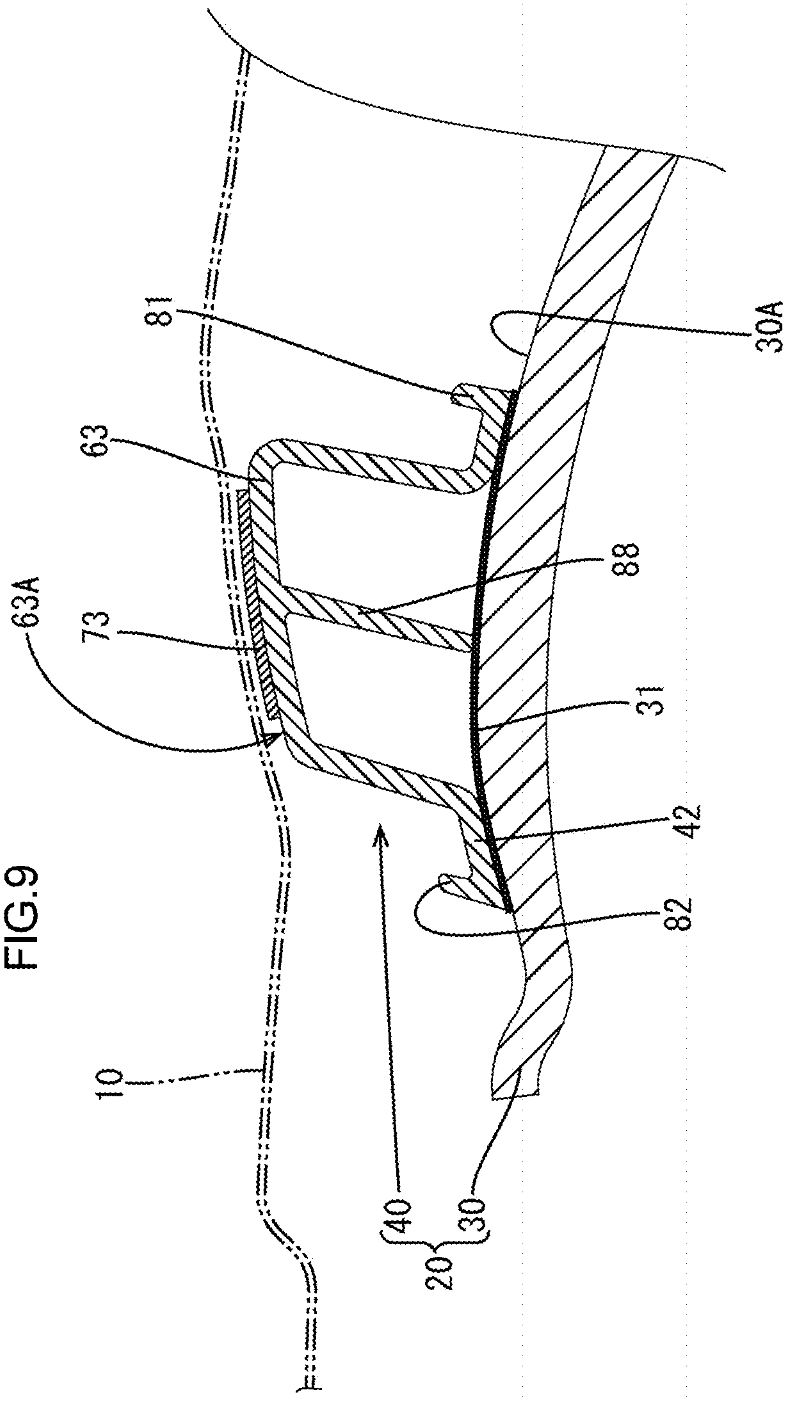
FIG. 9 is a cross-sectional view of the ceiling interior component taken along line IX-IX in FIG. 5.

As illustrated in FIG. 9, the board member 30 covers a roof panel 10 (a vehicular panel) from a vehicular interior side and is configured as a ceiling of a vehicular compartment. The board member 30 may be made of synthetic resin material such as urethane foam; however, the material of the board member 30 may not be limited to synthetic resin material.

Figure 2:
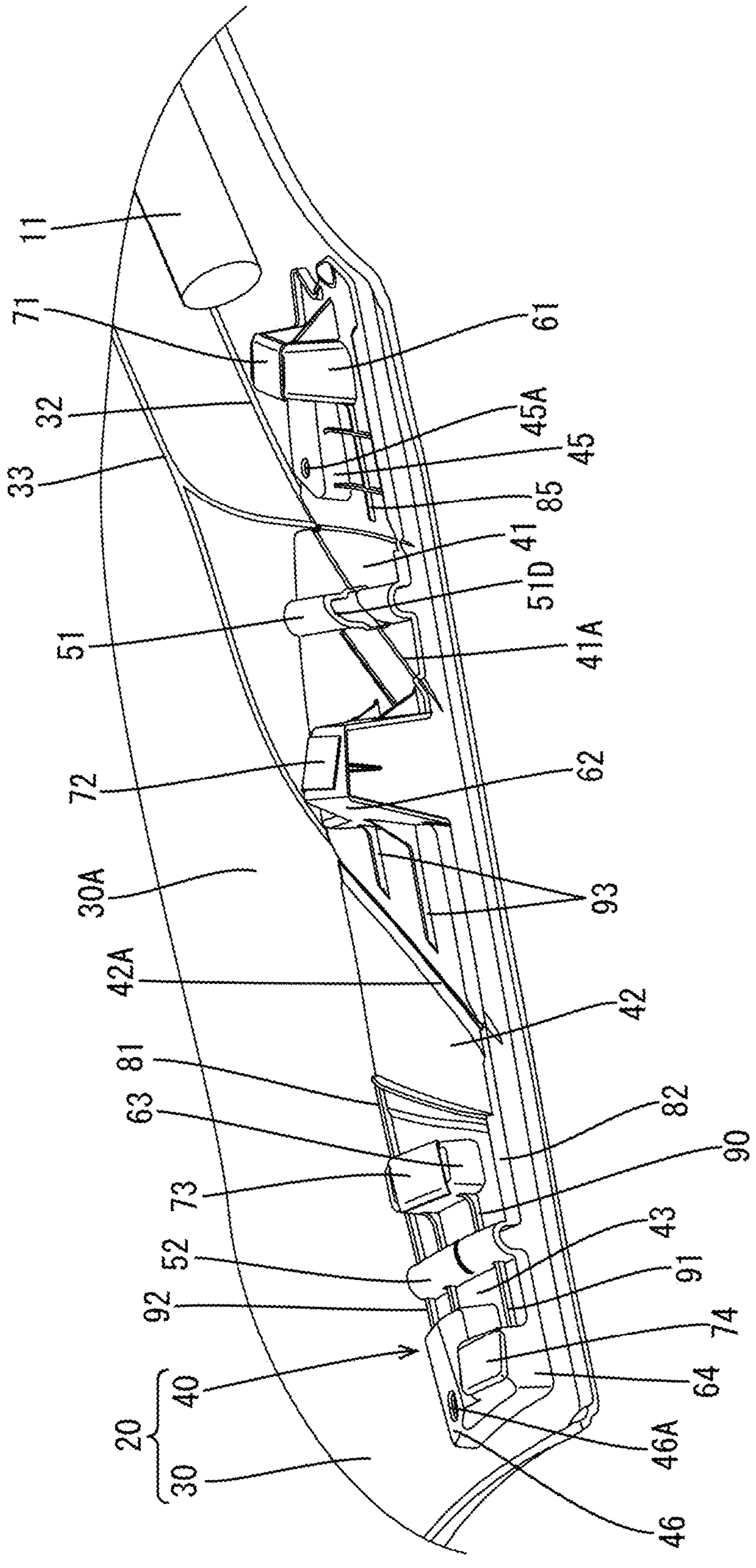
FIG. 2 is a perspective view of the ceiling interior component seen from a vehicular exterior side and illustrating a reinforcing member seen from a vehicular lateral side.

As illustrated in FIG. 2, the reinforcing member 40 has an elongated shape that is elongated in a vehicular front-rear direction. The reinforcing member 40 is arranged on a side edge portion of a vehicular rear edge portion of the board member 30. The reinforcing member 40 is made of synthetic resin such as polypropylene and polyethylene and the material of the reinforcing member 40 has a linear expansion coefficient greater than that of the material of the board member 30. The reinforcing member 40 includes a first fixing portion 41, a second fixing portion 42, a third fixing portion 43, a first connection portion 51, and a second connection portion 52. An adhesive layer 31 is on each of the first fixing portion 41, the second fixing portion 42, and the third fixing portion 43. Thus, the first fixing portion 41, the second fixing portion 42, and the third fixing portion 43 are fixed to a vehicular exterior side surface 30A of the board member 30 with the adhesive layers 31 (such as hot melt adhesive). The first fixing portion 41, the second fixing portion 42, and the third fixing portion 43 are away from each other. The first connection portion 51 connects the first fixing portion 41 and the second fixing portion 42 that are adjacent to each other. The second connection portion 52 connects the second fixing portion 42 and the third fixing portion 43 that are adjacent to each other.

Figure 6:
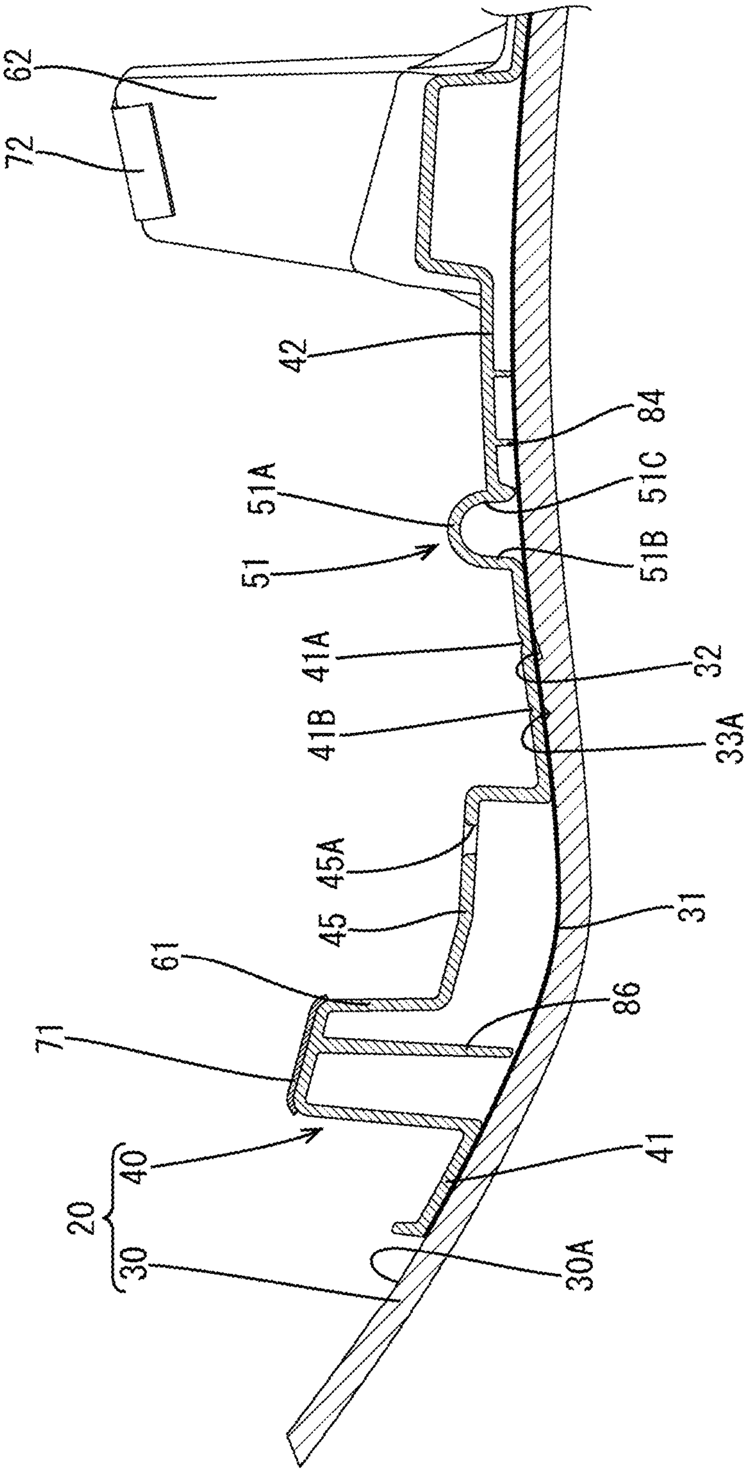
FIG. 6 is a cross-sectional view illustrating a portion of the reinforcing member taken along line VI-VI line in FIG. 5.
Figure 7:
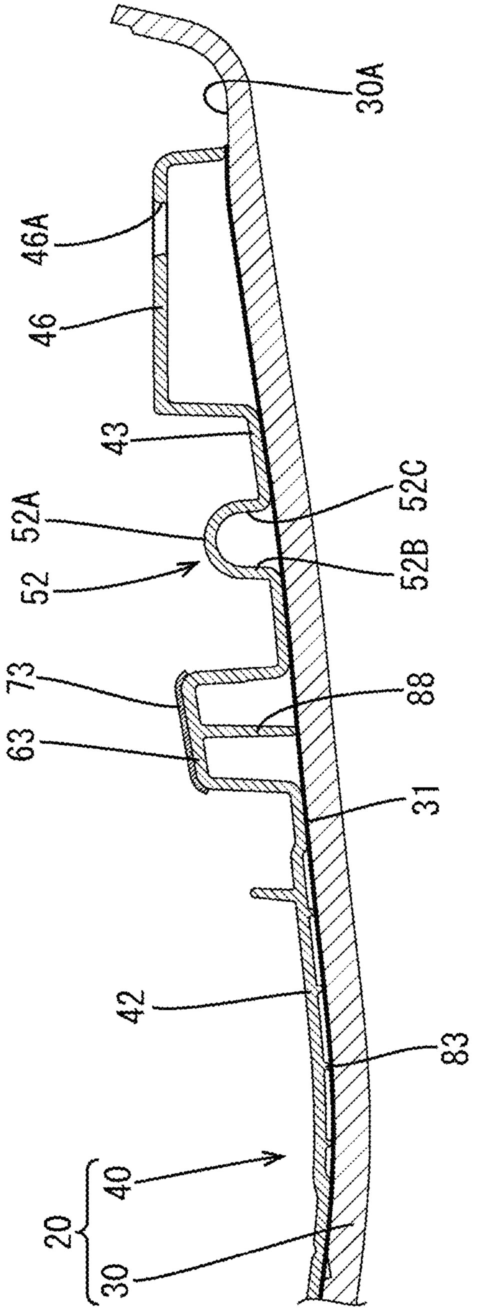
FIG. 7 is a cross-sectional view illustrating a portion of the reinforcing member taken along line VII-VII line in FIG. 5.

The first fixing portion 41, the second fixing portion 42, and the third fixing portion 43 are arranged along an elongated direction of the reinforcing member 40. The first fixing portion 41 and the second fixing portion 42 (a pair of fixing portions) are arranged along the elongated direction of the reinforcing member 40 and connected to each other by the first connection portion 51. The second fixing portion 42 and the third fixing portion 43 (a pair of fixing portions) are arranged along the elongated direction of the reinforcing member 40 and connected to each other by the second connection portion 52. As illustrated in FIGS. 6 and 7, the first connection portion 51 and the second connection portion 52 are not bonded to the vehicular exterior side surface 30A of the board member 30 and are away from the vehicular exterior side surface 30A.

As illustrated in FIGS. 2 to 5, the first connection portion 51 extends in a short-side direction (a width direction) of the reinforcing member 40. As illustrated in FIG. 6, the first connection portion 51 has a U-shaped cross section taken along the elongated direction of the reinforcing member 40 (a right-left direction in FIG. 6). More in detail, the first connection portion 51 includes a middle portion 51A, a first end portion 51B, and a second end portion 51C. The middle portion 51A is away from the vehicular exterior side surface 30A. The first end portion 51B and the second end portion 51C are in contact with the vehicular exterior side surface 30A. The first connection portion 51 is connected to the first fixing portion 41 via the first end portion 51B and connected to the second fixing portion 42 via the second end portion 51C. The first connection portion 51 has a U-shape and extends from the first end portion 51B to the second end portion 51C to be curved to be away from the vehicular exterior side surface 30A. As illustrated in FIG. 7, the second connection portion 52 extends in the short-side direction (the width direction) of the reinforcing member 40. As illustrated in FIG. 7, the second connection portion 52 has a U-shaped cross section taken along the elongated direction of the reinforcing member 40 (a right-left direction in FIG. 7). More in detail, the second connection portion 52 includes a middle portion 52A, a first end portion 52B, and a second end portion 52C. The middle portion 52A is away from the vehicular exterior side surface 30A. The first end portion 52B and the second end portion 52C are in contact with the vehicular exterior side surface 30A. The second connection portion 52 is connected to the second fixing portion 42 via the first end portion 52B and connected to the third fixing portion 43 via the second end portion 52C. The second connection portion 52 has a U-shape and extends from the first end portion 52B to the second end portion 52C to be curved to be away from the vehicular exterior side surface 30A.

As illustrated in FIG. 2, an airbag 11 (a curtain shield airbag) is arranged adjacent to the reinforcing member 40 on the vehicular exterior side of the board member 30. The airbag 11 extends in the vehicular front-rear direction and is arranged in front (on a left side in FIG. 1) of the reinforcing member 40 as illustrated by the broken line in FIG. 1. The airbag 11 is disposed corresponding to a vehicle occupants' space and the reinforcing member 40 is disposed corresponding to a luggage space. The portion of the board member 30 corresponding to the vehicle occupants' space is provided with components of the airbag 11 and has effective rigidity. However, the portion of the board member 30 corresponding to the luggage space is provided with no airbag and therefore, the reinforcing member 40 is disposed on the portion of the board member 30 corresponding to the luggage space to increase rigidity.

Figure 3:
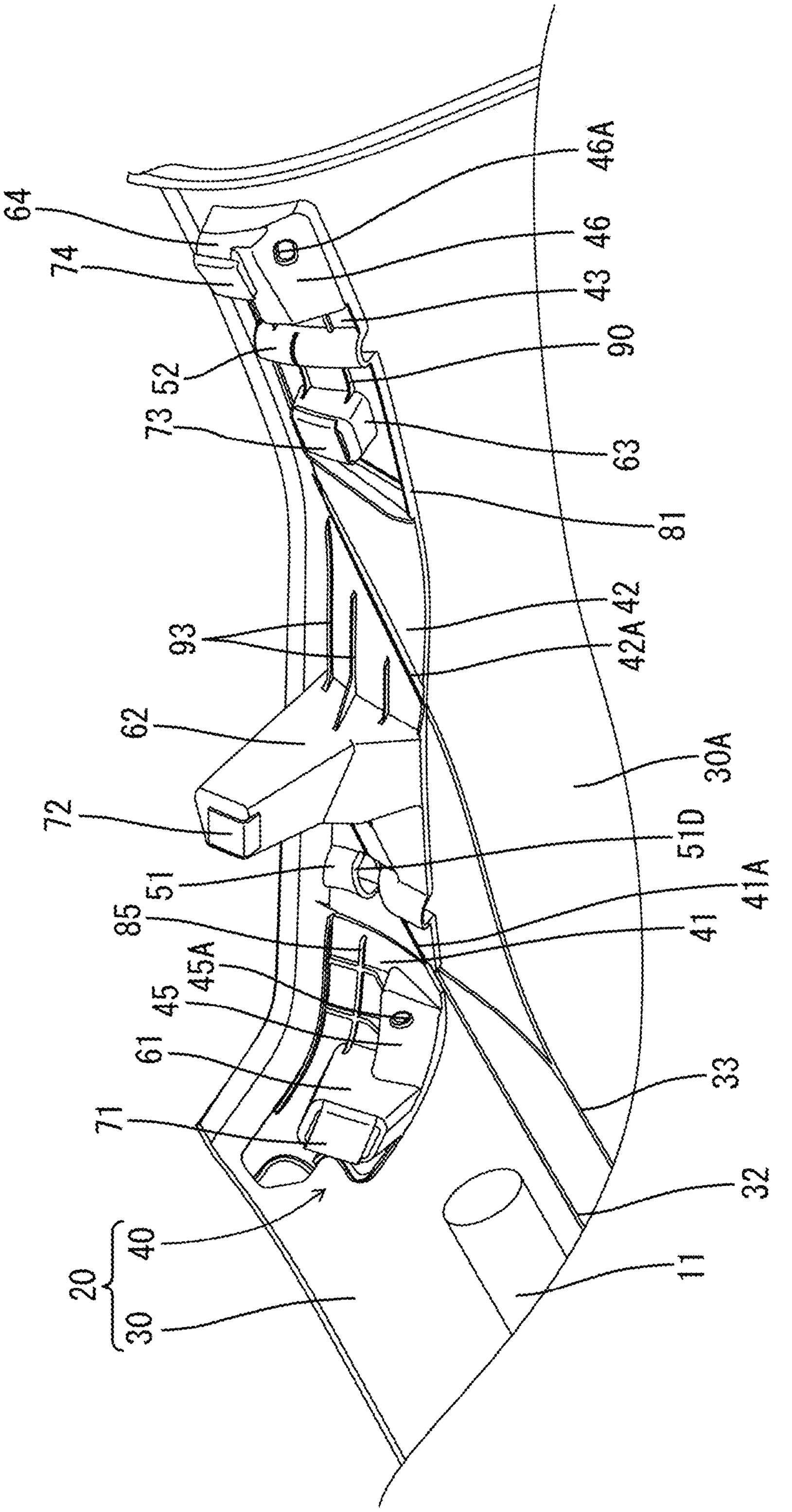
FIG. 3 is a perspective view of the ceiling interior component seen from the vehicular exterior side and illustrating the reinforcing member seen from an opposite side from the vehicular lateral side in FIG. 2.
Figure 5:
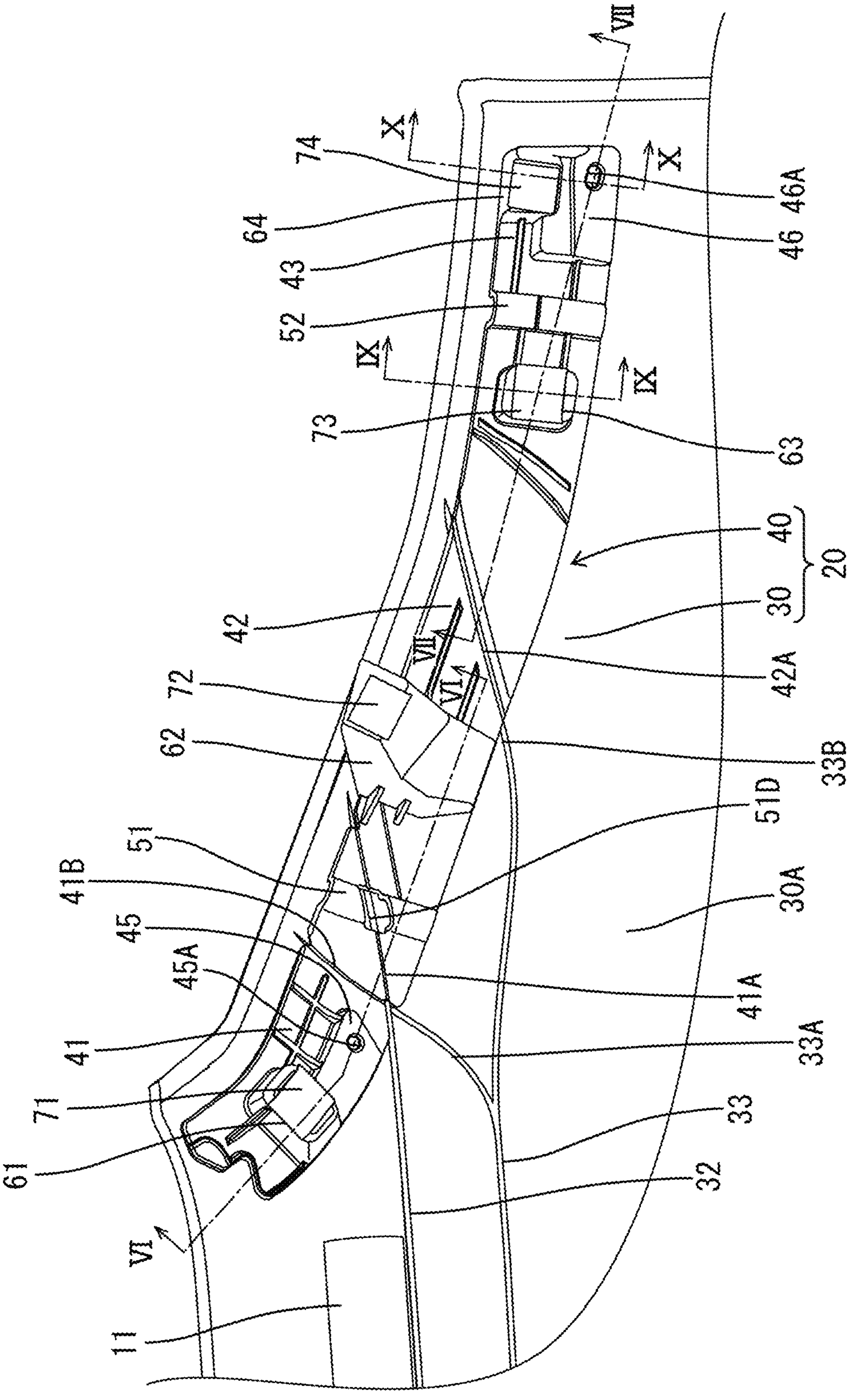
FIG. 5 is a plan view of the reinforcing member seen from the vehicular exterior side.

As illustrated in FIGS. 2 and 3, the board member 30 includes a first groove 32 (a recess) and a second groove 33 (a recess) on the vehicular exterior side surface 30A. The first groove 32 and the second groove 33 extend along the airbag 11. As illustrated in FIG. 5, one end (a portion) of the first groove 32 is continuous to the first connection portion 51 and the first connection portion 51 includes a cutout 51D through which the first connection portion 51 and the first groove 32 are connected. The first fixing portion 41 includes a groove 41A (a recess) on a vehicular exterior side surface thereof. The groove 41A is connected to the first groove 32.

As illustrated in FIGS. 2 and 3, the second groove 33 is branched into two end portions 33A, 33B near the reinforcing member 40. One end portion 33A of the second groove 33 extends to the first fixing portion 41 and the other end portion 33B extends to the second fixing portion 42. The end portion 33A of the second groove 33 is connected to a groove 41B (a recess) that is formed in a vehicular exterior side surface of the first fixing portion 41. The end portion 33B of the second groove 33 is connected to a groove 42A (a recess) that is formed in a vehicular exterior side surface of the second fixing portion 42.

Figure 4:
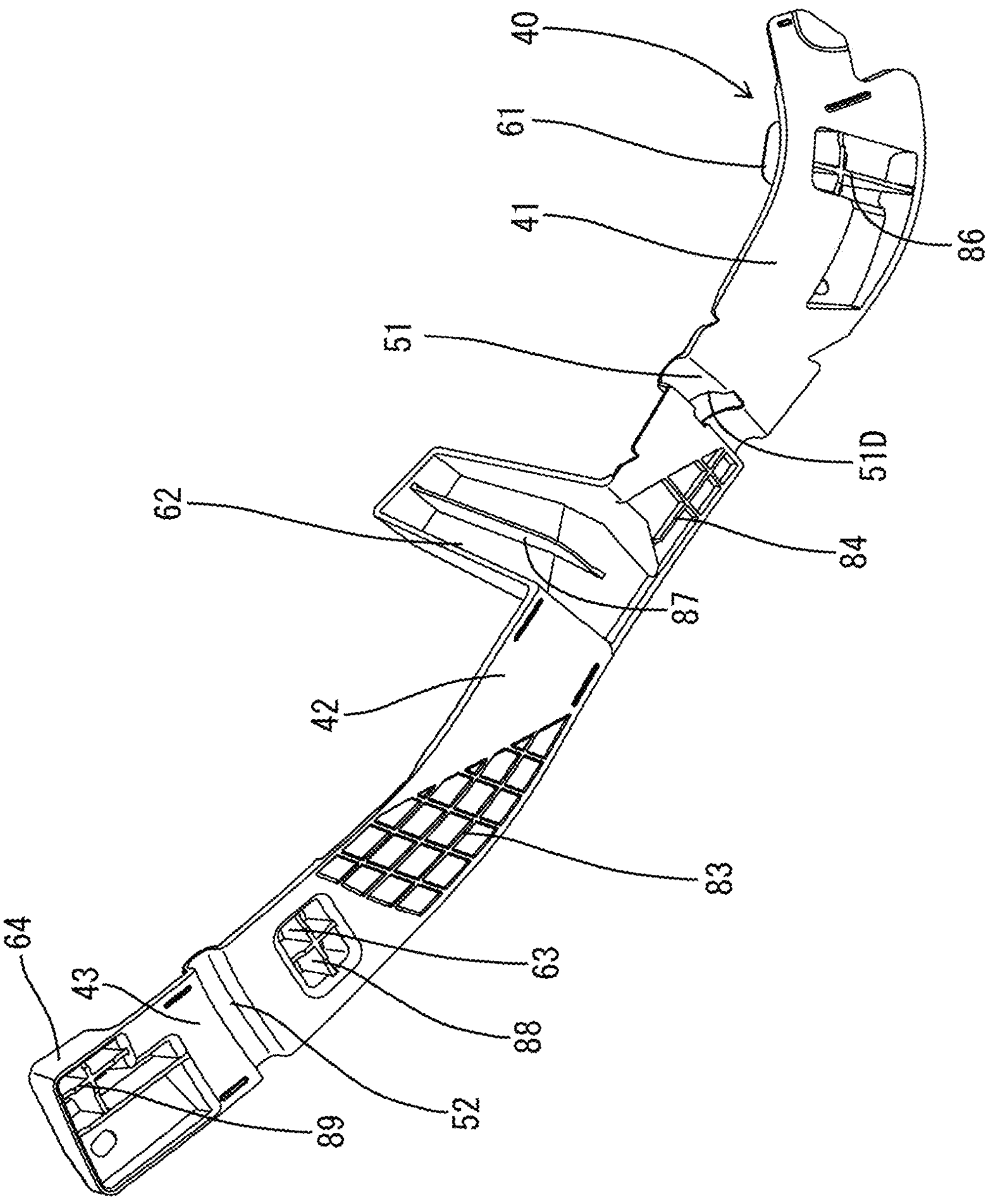
FIG. 4 is a perspective view of the reinforcing member seen from a vehicular interior side.
Figure 8:
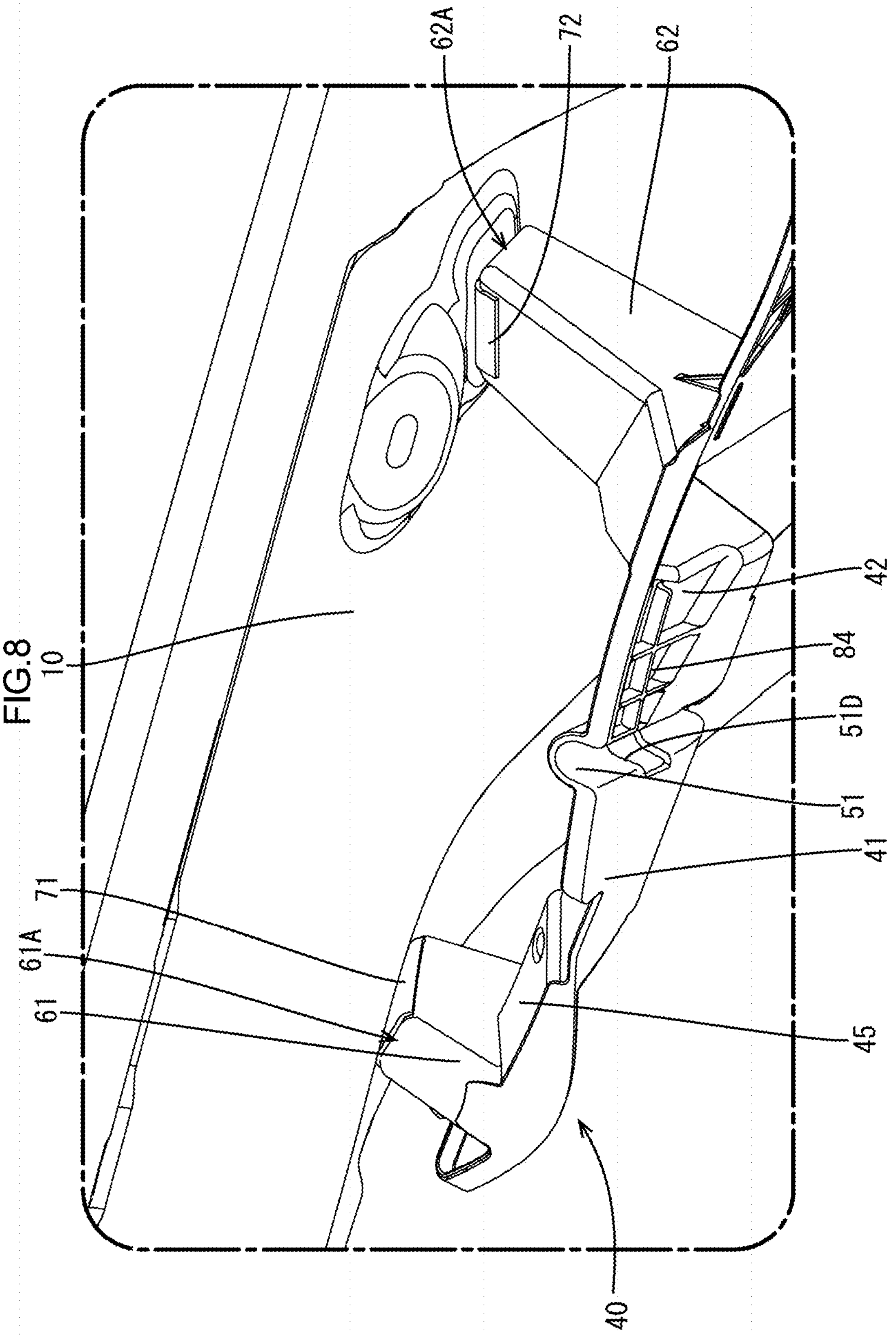
FIG. 8 is a perspective view illustrating the reinforcing member and a roof panel seen from the vehicular interior side.

As illustrated in FIG. 3, the first connection portion 51 and the second connection portion 52 are arranged along the elongated direction of the reinforcing member 40. A projecting portion 62 projects from a vehicular exterior side surface of the second fixing portion 42 (one of the pair of fixing portions) toward the roof panel 10 (the vehicular panel). The first connection portion 51 and the second connection portion 52 are disposed to sandwich the projecting portion 62. The projecting portion 62 has a box shape that opens downward and toward the vehicular interior side as illustrated in FIG. 4. As illustrated in FIG. 8, the projecting portion 62 has a projecting end surface 62A that is opposite the roof panel 10 via a buffer member 72. A projecting portion 61 projects from a vehicular exterior side surface of the first fixing portion 41 toward the roof panel 10. The projecting portion 61 has a box shape that opens toward the vehicular interior side. The projecting portion 61 has a projecting end surface 61A that is opposite the roof panel 10 via a buffer member 71.

As illustrated in FIG. 2, a projecting portion 63 projects from a vehicular exterior side surface of the second fixing portion 42 toward the roof panel 10. The projecting portion 63 is adjacent to the second connection portion 52. As illustrated in FIG. 9, the projecting portion 63 has a box shape that opens toward the vehicular interior side (downward in FIG. 9). The projecting portion 63 has a projecting end surface 63A that is opposite the roof panel 10 via a buffer member 73.

Figure 10:
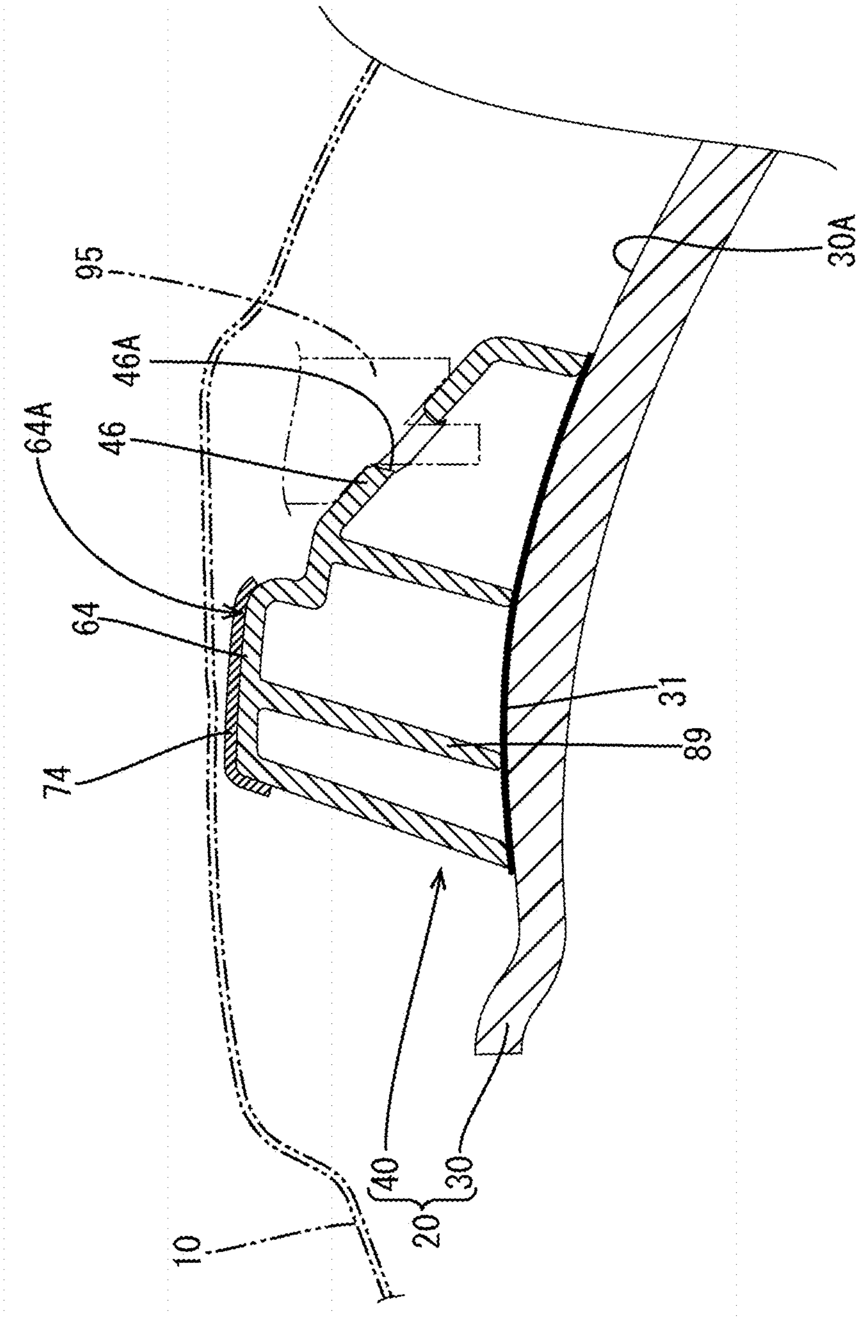
FIG. 10 is a cross-sectional view of the ceiling interior component taken along line X-X in FIG. 5.

As illustrated in FIG. 2, a projecting portion 64 projects from a vehicular exterior side surface of the third fixing portion 43 toward the roof panel 10. As illustrated in FIG. 10, the projecting portion 64 has a box shape that opens toward the vehicular interior side (downward in FIG. 10). The projecting portion 64 has a projecting end surface 64A that is opposite the roof panel 10 via a buffer member 74. The reinforcing member 40 includes the projecting portions 61, 62, 63, 64. Therefore, when the board member 30 is pressed toward the vehicular exterior side (toward the roof panel 10), the projecting end surfaces 61A, 62A, 63A, 64A of the projecting portions 61, 62, 63, 64 are contacted with the roof panel 10 via the buffer members 71, 72, 73, 74, respectively. According to such a configuration, the board member 30 is less likely to move or to be deformed toward the vehicular exterior side. The buffer members 71, 72, 73, 74 are opposite the roof panel 10 with a slight clearance but may be contacted with the roof panel 10. The buffer members 71, 72, 73, 74 may not be provided and the projecting end surfaces 61A, 62A, 63A, 64A of the projecting portions 61, 62, 63, 64 may be directly contacted with the roof panel 10.

As illustrated in FIG. 3, a projecting portion 45 projects from a vehicular exterior side surface of the second fixing portion 42 toward the roof panel 10. The projecting portion 45 is continuous to the projecting portion 61. The projecting portion 45 has a box shape that opens toward the vehicular interior side. The projecting portion 45 has a projecting end surface and a through hole 45A in the projecting end surface. A projecting portion 46 projects from the vehicular exterior side surface of the second fixing portion 42 toward the roof panel 10. The projecting portion 46 is continuous to the projecting portion 64. The projecting portion 46 has a box shape that opens toward the vehicular interior side. The projecting portion 46 has a projecting end surface and a through hole 46A in the projecting end surface.

To bond the reinforcing member 40 to the board member 30, tip end portions of positioning pins 95 (see a chain line in FIG. 10) are inserted in the through holes 45A, 46A, respectively, from an opposite side from the board member 30. Thus, the reinforcing member 40 is positioned with respect to the board member 30 correctly. Then, by moving the positioning pins 95 toward the board member 30, the reinforcing member 40 can be bonded to the board member 30 at the correct position. The through holes 45A, 46A that are in the projecting end surfaces of the projecting portions 45, 46 are away from the adhesive layer 31. Therefore, the distal end portions of the positioning pins 95 that are inserted in the through holes 45A, 46A are not contacted with the adhesive layer 31.

As illustrated in FIGS. 2, 3, and 9, each of the first fixing portion 41, the second fixing portion 42, and the third fixing portion 43 includes ribs 81, 82. The ribs 81, 82 project from the vehicular exterior side surface of outer peripheral edge portions of the first fixing portion 41, the second fixing portion 42, and the third fixing portion 43 toward the vehicular exterior side. As illustrated in FIG. 4, ribs 83, 84 are formed on the vehicular interior side surface of the second fixing portion 42. The ribs 83, 84 are formed in a grid. As illustrated in FIG. 3, a rib 85 projects from the vehicular exterior side surface of the first fixing portion 41 toward the vehicular exterior side. The rib 85 is formed in a grid and is continuous to the projecting portions 45, 61. As illustrated in FIG. 4, the projecting portions 61, 62, 63, 64 include ribs 86, 87, 88, 89 therein, respectively.

As illustrated in FIG. 2, the reinforcing member 40 includes ribs 90, 91, 92, 93. The rib 90 projects from the vehicular exterior side surface of the second fixing portion 42. The rib 90 connects the projecting portion 63 and the second connection portion 52. The ribs 91, 92 project from the vehicular exterior side surface of the third fixing portion 43. The rib 91 connects the projecting portion 64 and the second connection portion 52. The rib 92 connects the projecting portion 46 and the second connection portion 52. The ribs 93 project from the vehicular exterior side surface of the second fixing portion 42. The ribs 93 are adjacent to the projecting portion 62 and are continuous to the projecting portion 62. With the ribs 81 to 93, rigidity of the reinforcing member 40 can be increased.

Effects of this embodiment will be described next. In this embodiment, the first fixing portion 41 and the second fixing portion 42 of the reinforcing member 40 are bonded to the board member 30. The first connection portion 51 of the reinforcing member 40 connects the first fixing portion 41 and the second fixing portion 42. The first connection portion 51 is not bonded to and not contacted with the vehicular exterior side surface 30A of the board member 30. The first connection portion 51 includes the middle portion 51A. The middle portion 51A is away from the vehicular exterior side surface 30A. The first connection portion 51 has a U-shape and extends from the first end portion 51B to the second end portion 51C to be curved to be away from the vehicular exterior side surface 30A.

With such a configuration, if the temperature of the reinforcing member 40 drops and the reinforcing member 40 shrinks, the first connection portion 51 expands or shrinks in the elongated direction of the reinforcing member 40 to absorb the thermal shrinkage of the reinforcing member 40. As a result, each of the first fixing portion 41 and the second fixing portion 42 that are bonded to the board member 30 can move independently. With the first fixing portion 41 and the second fixing portion 42 being connected by the first connection portion 51, the first fixing portion 41 and the second fixing portion 42 can move independently from each other if the reinforcing member 40 shrinks. When the reinforcing member 40 that is bonded to the board member 30 shrinks, the first connection portion 51 that connects the first fixing portion 41 and the second fixing portion 42 is deformed such that the first end portion 51B and the second end portion 51C become away from each other. As a result, the distance between the first fixing portion 41 and the second fixing portion 42 increases and the reinforcing member 40 can absorb the thermal shrinkage. Accordingly, the difference in the shrinkage amount between the reinforcing member 40 and the board member 30 can be absorbed by such deformation of the first connection portion 51. Accordingly, a wrinkle is less likely to be created on the board member 30.

The reinforcing member 40 includes the first fixing portion 41 and the second fixing portion 42 each of which is bonded to the board member 30 separately and can be deformed separately. With such a configuration, as the reinforcing member 40 shrinks, a large stress is less likely to locally act on the board member 30 and a wrinkle is less likely to be created on the board member 30. With the first fixing portion 41 and the second fixing portion 42 being connected by the first connection portion 51, the reinforcing member 40 is configured as one single component and can be easily handled and rigidity of the reinforcing member 40 is increased compared to a configuration that includes the first fixing portion 41 and the second fixing portion 42 as separate components. The second fixing portion 42 and the third fixing portion 43 that are connected by the second connection portion 52 exert similar effects.

The board member 30 includes the first groove 32 on the vehicular exterior side surface 30A. The first groove 32 extends along the airbag 11 that is disposed on the vehicular exterior side surface 30A adjacent to the reinforcing member 40. The first groove 32 is continuous to the first connection portion 51. The first connection portion 51 includes the cutout 51D through which the first connection portion 51 is connected to the first groove 32.

If the airbag 11 is activated, the board member 30 is pushed by the inflated airbag 11 and is bent along the first groove 32. Thus, the airbag 11 can be inflated smoothly. With the first connection portion 51 being connected to the first groove 32 at the cutout 51D, the board member 30 can be bent along the first groove 32 smoothly.

The first connection portion 51 and the second connection portion 52 are arranged along the elongated direction of the reinforcing member 40. By changing the arrangement of the first connection portion 51 and the second connection portion 52, the length of the second fixing portion 42 can be changed and the degree of the shrinkage of the second fixing portion 42 that is between the first connection portion 51 and the second connection portion 52 can be changed.

Out of the first fixing portion 41 and the second fixing portion 42, the second fixing portion 42 includes the projecting portion 62 that projects from the vehicular exterior side surface toward the roof panel 10. The first connection portion 51 and the second connection portion 52 are disposed to sandwich the projecting portion 62. If the board member 30 is deformed or moved toward the roof panel 10, the projecting end surface 62A of the projecting portion 62 comes in contact with the roof panel 10. Therefore, the board member 30 is less likely to be further moved toward the roof panel 10. This increases the rigidity of the board member 30.

The groove 41A is formed on the vehicular exterior side surface of the first fixing portion 41 and is connected to the first groove 32. The groove 41B is formed on the vehicular exterior side surface of the first fixing portion 41 and is connected to the end portion 33A of the second groove 33. The groove 42A is formed on the vehicular exterior side surface of the second fixing portion 42 and is connected to the end portion 33B of the second groove 33. With the grooves 41A, 41B, 42A, the bending of the board member 30 is less likely to be hindered by the reinforcing member 40 when the airbag 11 is inflated.

Other Embodiments

The present disclosure is not limited to the embodiments described above and illustrated in the drawings. The following embodiments may be included in the technical scope of the technology described herein. The technology described herein may be modified within the technical scope.

(1) The ceiling interior component 20 according to the above embodiment is not necessarily for a vehicle such as an automobile but may be used for vehicles on ground such as a train and an amusement vehicle, aircrafts such as an airplane and a helicopter, and watercrafts such as a ship and underwater vehicles such as a submarine.

(2) In the above embodiment, the first connection portion 51 and the second connection portion 52 have a U-shaped cross section but may not necessarily have such a shape. For example, the connection portion may have a V-shaped cross section.

(3) In the above embodiment, the reinforcing member 40 is disposed adjacent to the airbag 11 and the first connection portion 51 includes the cutout 51D such that the airbag 11 can be inflated easily. However, the first connection portion 51 may include the cutout 51D in a configuration without including the airbag 11. Even without including the airbag 11, the rigidity of the reinforcing member 40 can be changed by changing the size of the cutout 51D of the first connection portion 51 appropriately.

(4) In the above embodiment, the roof panel 10 is used an example of a vehicular panel but any other vehicular panel can be used.

(5) In the above embodiment, the first connection portion 51 and the second connection portion 52 are disposed along the elongated direction of the reinforcing member 40. However, three or more connection portions may be disposed along the elongated direction of the reinforcing member.

The invention claimed is:

1. A vehicular ceiling interior component comprising:

a board member that is a plate member and configured as a ceiling of a vehicular compartment; and a reinforcing member having an elongated shape and extending in an elongated direction, the reinforcing member being disposed on a vehicular exterior side surface of the board member and being made of material having a linear expansion coefficient greater than a linear expansion coefficient of material of the board member, the reinforcing member including a first fixing portion and a second fixing portion each of which is fixed to the vehicular exterior side surface of the board member and that are arranged along the elongated direction, and a connection portion that connects the first fixing portion and the second fixing portion and is away from the vehicular exterior side surface of the board member, wherein the board member includes a recess on the vehicular exterior side surface and the recess extends along an airbag that is on the vehicular exterior side surface and adjacent to the reinforcing member, the connection portion includes a cutout, and the recess is continuous to the connection portion via the cutout.

2. The vehicular ceiling interior component according to claim 1, wherein the connection portion includes a first end portion that is continuous to the first fixing portion, a second end portion that is continuous to the second fixing portion, and a middle portion that extends from the first end portion to the second end portion and is away from the vehicular exterior side surface of the board member.

3. The vehicular ceiling interior component according to claim 2, wherein the middle portion has a curved shape.

4. The vehicular ceiling interior component according to claim 1, wherein the reinforcing member further includes a third fixing portion that is fixed to the vehicular exterior side surface of the board member, and a first connection portion that connects the second fixing portion and the third fixing portion, wherein the first fixing portion, the second fixing portion, and the third fixing portion are arranged along the elongated direction, and the second fixing portion is disposed between the first fixing portion and the third fixing portion.

5. The vehicular ceiling interior component according to claim 4, wherein the reinforcing member further includes a projecting portion projecting from a vehicular exterior side surface of the second fixing portion toward a vehicular panel, and the projecting portion is between the connection portion and the first connection portion.

6. The vehicular ceiling interior component according to claim 4, wherein the first fixing portion, the second fixing portion, and the third fixing portion include ribs projecting from vehicular exterior side surfaces thereof.

7. The vehicular ceiling interior component according to claim 1, wherein the first fixing portion and the second fixing portion are fixed to the vehicular exterior side surface of the board member with adhesive.

8. The vehicular ceiling interior component according to claim 1, wherein vehicular interior side surfaces of the first fixing portion and the second fixing portion are fixed to the vehicular exterior side surface of the board member.

9. The vehicular ceiling interior component according to claim 1, wherein the second fixing portion includes ribs projecting from a vehicular interior side surface of the second fixing portion.

* * * * *